Dec. 13, 1966   W. H. MORRISON ETAL   3,290,735
APPARATUS FOR MAKING A TRIMETAL BEARING MATERIAL
Filed April 10, 1963   7 Sheets-Sheet 1

INVENTORS
WILBERT H. MORRISON
RUDOLPH. A. BRAUN
BY
Eber J. Hyde
ATTORNEY

Dec. 13, 1966   W. H. MORRISON ET AL   3,290,735
APPARATUS FOR MAKING A TRIMETAL BEARING MATERIAL
Filed April 10, 1963   7 Sheets-Sheet 7

INVENTORS
WILBERT H. MORRISON
RUDOLPH A. BRAUN
BY
*Eber J. Hyde*
ATTORNEY

United States Patent Office 3,290,735
Patented Dec. 13, 1966

1

3,290,735
APPARATUS FOR MAKING A TRIMETAL
BEARING MATERIAL
Wilbert H. Morrison, Euclid, and Rudolph A. Braun,
Willoughby, Ohio, assignors to Clevite Corporation, a
corporation of Ohio
Filed Apr. 10, 1963, Ser. No. 271,959
8 Claims. (Cl. 22—57.3)

This invention relates to an apparatus for making material for a trimetal bearing.

An object of the invention is to provide a method of making a trimetal bearing material that is much less expensive than the method used in the past.

A further object of the invention is to provide apparatus for depositing babbitt on a metal strip that is much less costly than the apparatus used in the past.

Another object of the invention is to provide a method of controlling the thickness of the babbitt layer by rolling the steel and sintered copper alloy strip to a predetermined thickness.

Another object of the invention is to provide apparatus for and a method of making strip material for trimetal bearings, wherein the strip is comprised of a steel backing member to which is adhered sintered copper alloy into the interstices of which is infiltrated bearing material such as babbitt.

For a better understanding of the present invention, together with other and further objects thereof, reference is had to the following description taken in connection with the accompanying drawings, and its scope will be pointed out in the appended claims.

With reference to the drawings there is shown diagrammatically in FIGURE 1 a method of and apparatus for making trimetal bearing material;

FIGURE 8 is a view taken on the line 8—8 of FIGURE 6a;

In the present invention, a steel strip is passed through an apparatus which deposits a mixture of copper powder and bronze powder on the upper face of the steel strip. One formula for bronze powder is 90% copper and 10%

2 tin. The steel strip is then passed through a furnace which causes the copper powder particles and the bronze powder particles to bond to each other and to bond to the steel strip to form a layer of sintered copper alloy on the steel strip. The steel strip and the sintered copper alloy layer are then cooled to a lower temperature so that babbitt may later be infiltrated into the sintered copper alloy layer. The unitary steel and sintered copper alloy strip is then passed between a pair of rollers which compress the steel and sintered copper alloy strip to a predetermined thickness. The steel and sintered copper alloy strip is then passed through a babbitt depositing apparatus. The babbitt depositing apparatus deposits liquid babbitt on the sintered copper where in its liquid phase it infiltrates into the pores or interstices. The babbitt is then cooled so that it becomes a solid which is bonded to the sintered copper alloy and to the steel layer. The steel and sintered copper alloy layer and the babbitt layer together form a trimetal bearing material. The babbitt depositing apparatus includes means for distributing liquid babbitt on the sintered copper alloy layer and means for preventing backward flow of the liquid babbitt on the sintered copper alloy. The babbitt depositing apparatus also includes means for engaging the edges of the steel strip to prevent the flow of liquid babbitt off the edges of the strip and means for cooling the liquid babbitt to cause it to become a solid and to bond to the sintered copper alloy layer while the strip is held in a reducing environment.

Figure 1:
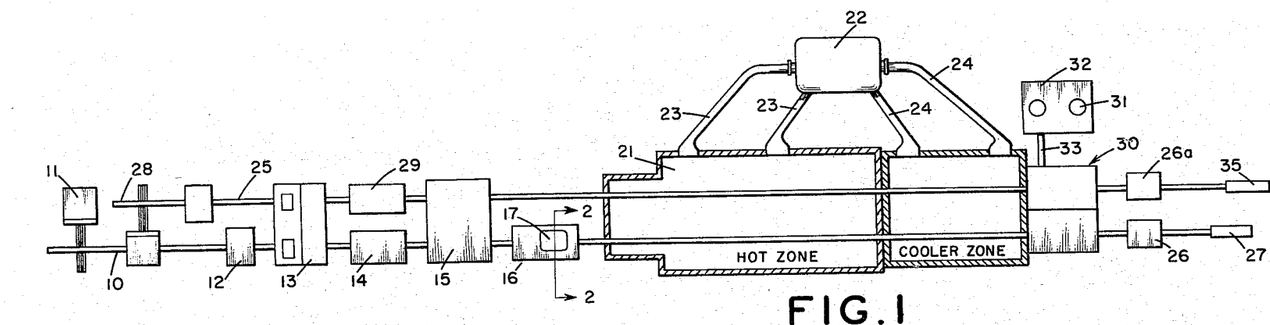

In FIGURE 1 of the drawings one method of making a trimetal bearing material is shown. A coil of steel strip 10 is placed on a pay-out reel 11. The steel strip 10 is uncoiled and is passed through a squaring shear 12 and is then passed through an electric welder 13 where its front end is welded to the back end of a previous strip. It is then passed over a loop pull-up 14 and then passed through a leveller 15. Details of these devices are old in the art.

Figure 2:
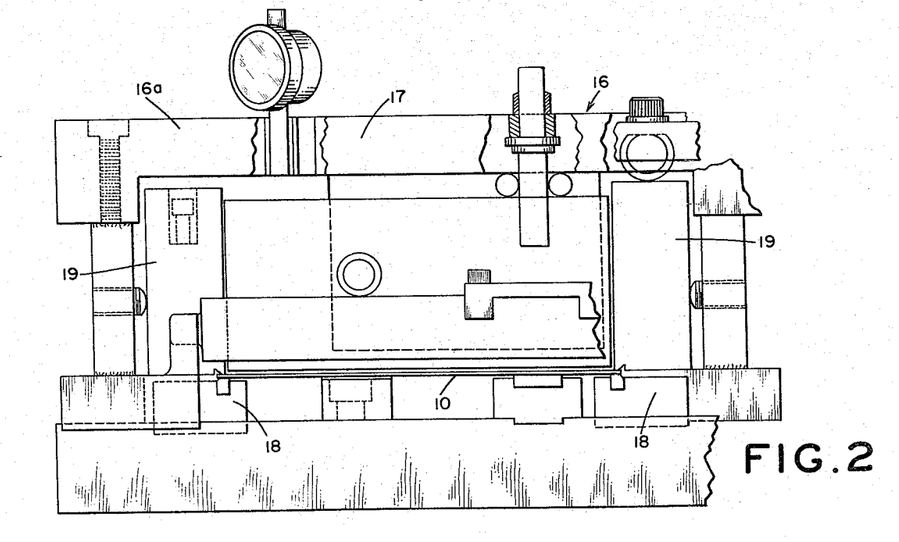
FIGURE 2 is a cross-sectional view through the copper-bronze powder spreading device taken on the line 2—2 of FIGURE 1.
Figures 3, 4:
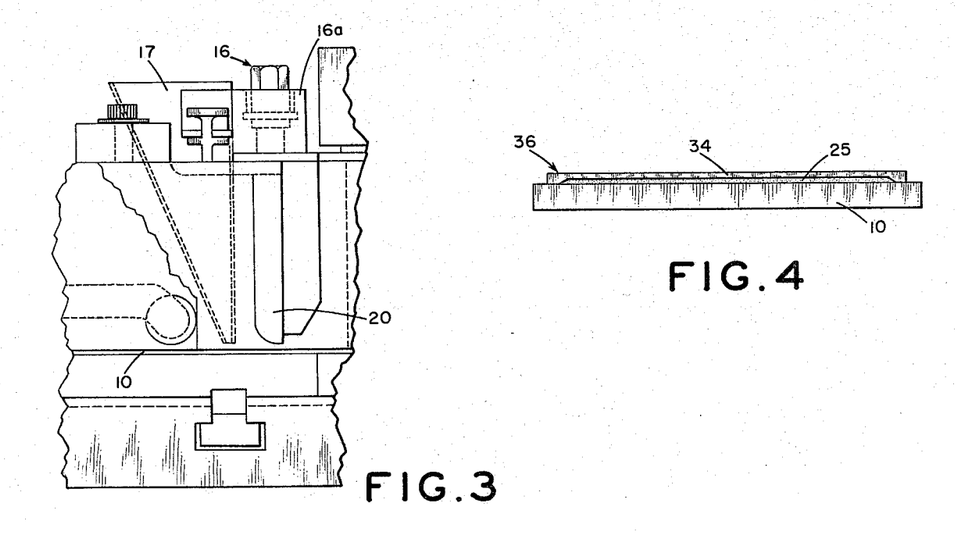
FIGURE 3 is an elevational view of the copper-bronze powder spreading device.
FIGURE 4 is a cross-sectional view taken through the trimetal bearing material which is produced.

A powder supply apparatus is shown at 16. A mixer is provided for blending copper powder and bronze powder together to form a mixture of about 80% copper powder and 20% bronze powder, though the exact proportions may vary considerably. This mixture is stored in a hopper 17. The powder supply apparatus 16 includes a weir support bar 16a and a pair of spaced horizontally disposed lower rails 18 and a pair of spaced horizontally disposed upper rails 19. The upper and lower rails 19 and 18 grip the edges of the steel strip 10. The powder supply apparatus 16 also includes a weir 20. The mixture of copper powder and bronze powder flows down the hopper 17 onto the steel strip 10 and the weir 20 measures the thickness of the layer of copper powder and bronze powder on the steel strip 10.

A furnace 21, for example, an electric furnace, has a hot zone and a cooler zone as shown in FIGURE 1. A gas generator 22 generates a mixture of hydrogen gas, carbon monoxide gas and nitrogen gas with hydrogen and carbon monoxide gas as active reducing agents. A pair of conduits 23 connect the gas generator 22 to the hot zone of the furnace 21. A pair of conduits 24 connect the gas generator 22 to the cooler zone of the furnace 21. The gas generator 22 moves the hydrogen gas, carbon monoxide gas and nitrogen gas through the conduits 23 and 24 to the furnace 21. The hot zone of the furnace 21 has a temperature of about 1880° F.

The steel strip 10 is then moved through the furnace 21. The copper powder particles and the bronze powder particles are bonded to each other and to the steel strip 10 when the steel strip 10 passes through the hot zone of the furnace to form a layer 25 of sintered copper alloy.

The copper powder particles and the bronze powder particles would not bond to each other and would not bond to the steel strip 10 without the reducing atmosphere created by the hydrogen, carbon monoxide and nitrogen gases. The steel strip 10 and the copper alloy layer 25 are then passed through the cooler zone of the electric furnace where the steel strip and the layer 25 of sintered copper are cooled to a temperature of about 700° F. and then quenched to room temperature while still under the reducing atmosphere by passing it through the quenching apparatus of an inactive babbitt depositing apparatus 30. The strip 10 and the copper alloy layer 25 are then passed between a pair of rollers 26 where the strip 10 and the copper alloy layer are compressed to a predetermined thickness of steel and sintered copper. The strip 10 and the copper alloy layer 25 are then rewound on a coiler 27.

The coil of steel and sintered copper alloy strip is then moved to the forward end of the assembly line and placed on a pay-out reel 28. The steel and sintered copper alloy strip is then passed over a loop pull-up 29. The steel and copper alloy strip is then passed through the furnace 21 where it is reheated to a temperature of about 1800° F. and then cooled to an intermediate temperature of about 1000° F. in the cold zone of the furnace. The interior of the babbitt depositing apparatus 30 has a temperature of about 700° F. Babbitt is melted in the gas fired pots 31 in the heater 32 and liquid babbitt is conveyed through the conduit 33 to the babbitt depositing apparatus 30. The steel and sintered copper alloy strip is then passed through the babbitt depositing apparatus 30 which deposits liquid babbitt on the sintered copper alloy and then cools the liquid babbitt so that the babbitt becomes a solid to form a layer of babbitt 34 on the sintered copper alloy layer 25, and the babbitt bonds to the top of the copper alloy layer 25 and also flows into the pores of the copper alloy layer 25 and chemically bonds to the copper alloy layer. A suitable babbitt has the formula 92½% lead, 3½% antimony, and 4% tin. The steel and sintered copper alloy strip is then rewound onto a coiler 35. The steel and sintered copper alloy and babbitt strip is now ready to be cut into small pieces and bent to form bearings. The trimetal bearing material 36 can be milled to remove excess babbitt prior to forming bearing blanks. The steel and sintered copper alloy and babbitt strip together form the trimetal bearing material 36. The steel strip 10 and the copper alloy layer 25 and the babbitt layer 34 are moved through the two lines by the leveller 15 and the motor driven rollers 26 and 26a.

Figure 5:
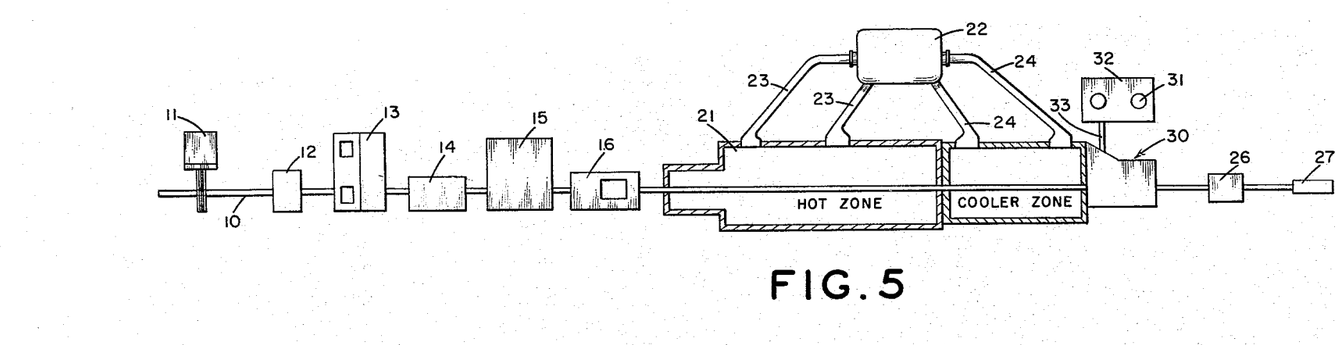
FIGURE 5 is an alternate device and method for producing the trimetal bearing material shown in FIGURE 4.

In FIGURE 5 of the drawings a modified method of making the trimetal bearing material 36 is shown. The same reference characters are used for corresponding parts as are used in FIGURE 1. A number of coils of steel strip 10 are stored in a rack, not shown. The method of making the trimetal bearing material 36 shown in FIGURE 5 is as follows: one of the coils of steel strip 10 is removed from the rack and placed on the pay-out reel 11. The steel strip 10 is uncoiled and is passed through a squaring shear 12 and is then passed through an electric welder 13 and is then passed over a loop pull-up 14. The steel strip 10 is then passed through a leveller 15. A powder supply apparatus is shown at 16. A mixer is provided for blending copper powder and bronze powder together to form a mixture of 80% copper powder and 20% bronze powder. This mixture is conveyed to a hopper. The powder supply apparatus 16 is identical with the one shown in FIGURES 2 and 3. The mixture of copper powder and bronze powder flows from the hopper into the powder supply apparatus 16 and the powder supply apparatus releases a mixture of copper powder and bronze powder onto the steel strip 10.

The furnace 21 has a hot zone and a cooler zone as shown in FIGURE 5. A gas generator 22 generates a mixture of hydrogen gas, carbon monoxide gas, and nitrogen gas with hydrogen and carbon monoxide gas as active reducing agents. A pair of conduits 23 connect the gas generator 22 to the hot zone of the furnace 21. A pair of conduits 24 connect the gas generator 22 to the cold zone of the furnace 21. The gas generator 22 moves the hydrogen gas, carbon monoxide gas and nitrogen gas through the conduits 23 and 24 to the furnace 21. The hot zone of the furnace 21 has a temperature of about 1880° F. The steel strip 10 is then moved through the furnace 21. The copper powder particles and the bronze powder particles are bonded to each other and to the steel strip 10 when the steel strip 10 passes through the hot zone of the furnace 21 to form a layer 25 of sintered copper alloy. The steel strip 10 is then passed through the cold zone of the furnace 21 where the steel strip 10 and the layer 25 of sintered copper alloy are cooled to a temperature of about 1000° F. so that babbitt can later be bonded to the sintered copper alloy. The strip 10 and the copper alloy layer 25 are then passed between a pair of rollers 37 and 38 where the strip 10 and the copper alloy layer are compressed to a predetermined thickness of steel and sintered copper alloy.

A babbitt depositing apparatus is shown at 30. Babbitt is melted in the gas fired pots 31 in the heater 32 and liquid babbitt is conveyed through the conduit 33 to the babbitt depositing apparatus 30. The interior of the babbitt depositing apparatus 30 is at a temperature of about 700° F. The steel and sintered copper alloy strip is then passed through the babbitt depositing apparatus 30 which deposits liquid babbitt on the sintered copper and then cools the liquid babbitt so that the babbitt becomes a solid to form a layer of babbitt 34 on the sintered copper alloy layer 25, and the babbitt bonds to the top of the copper alloy layer 25 and also flows into the pores of the copper alloy layer 25 and chemically bonds to the copper alloy layer. A suitable babbitt has the formula 92½% lead, 3½% antimony and 4% tin. The steel and sintered copper alloy and babbitt strip is then rewound onto a coiler 27. The steel and sintered copper alloy and babbitt strip is now ready to be cut into small pieces and bent to form bearings. The steel and sintered copper alloy and babbitt strip together form the trimetal bearing material 36. The trimetal bearing material 36 can be milled to remove excess babbitt prior to forming bearing blanks. The steel strip 10 and the copper alloy layer 25 and the babbitt layer 34 are moved through the line by the leveller 15 and the motor driven rollers 26.

Applicants' two-line method has the advantage over applicants' one-line method in that there is better control of the thickness of the steel and sintered copper strip because in the two-line method the operator can inspect the material leaving the rollers 26 while in the one-line method the operator cannot inspect the material leaving the rollers 37 and 38 because they are inside the babbitt depositing apparatus 30. However, applicants' one-line method is more economical than applicants' two-line method.

Applicant's two methods control the thickness of the babbitt layer by rolling the steel and sintered copper alloy strip to a predetermined thickness.

The babbitt depositing apparatus 30 is comprised of a housing 39. The housing 39 includes a bottom wall 40 and a pair of vertically disposed side walls 41 secured to the bottom wall. The housing 39 also includes an entrance end 42 for the steel and sintered copper strip and an exit end 43 for the strip. The housing 39 also includes a cover comprising cover plates 44, 45, 46 and member 47 all positioned upon and extending between and fixedly secured to the side walls 41. Each side wall 41 is provided with a vertically disposed slot 48 adjacent the entrance end of the housing 39. A rib 49 is positioned in each slot 48 and is secured to the respective side wall 41 by screws 50. An inverted U-shaped member 51 is positioned in the housing 39. The U-shaped member 51 includes a bight 52 and a pair of legs 53. The bight 52 is provided with a circular recess 54 in its center. The bight 52 is also provided with four slots 55 extending therethrough. Each leg 53 is provided with a vertically disposed slot 56 in its outer face. The ribs 49 are disposed in the slots 56 to mount the U-shaped member 51 in the housing 39 for vertical upward movement or vertical downward movement. A securing element or screw 57 has its headed end disposed in the recess 54 in the member 51. A collar 58 surrounds the headed end of the screw 57 and is disposed in the recess 54 in the member 51. The collar 58 is secured to the member 51 by screws 59. Thus it will be seen that the headed end of the screw 57 is fixedly secured to the member 51. The external threads on the screw 57 are in threaded engagement with an internally threaded opening in the member 47. When the screw 57 is turned in one direction, the member 51 is moved vertically downwardly in the housing 39, and when the screw is turned in the opposite direction the member 51 is moved upwardly in the housing 39. A pair of screws 57a are in threaded engagement with internally threaded openings in the member 47 and engage the bight 52 of the U-shaped member 51.

Figure 6:
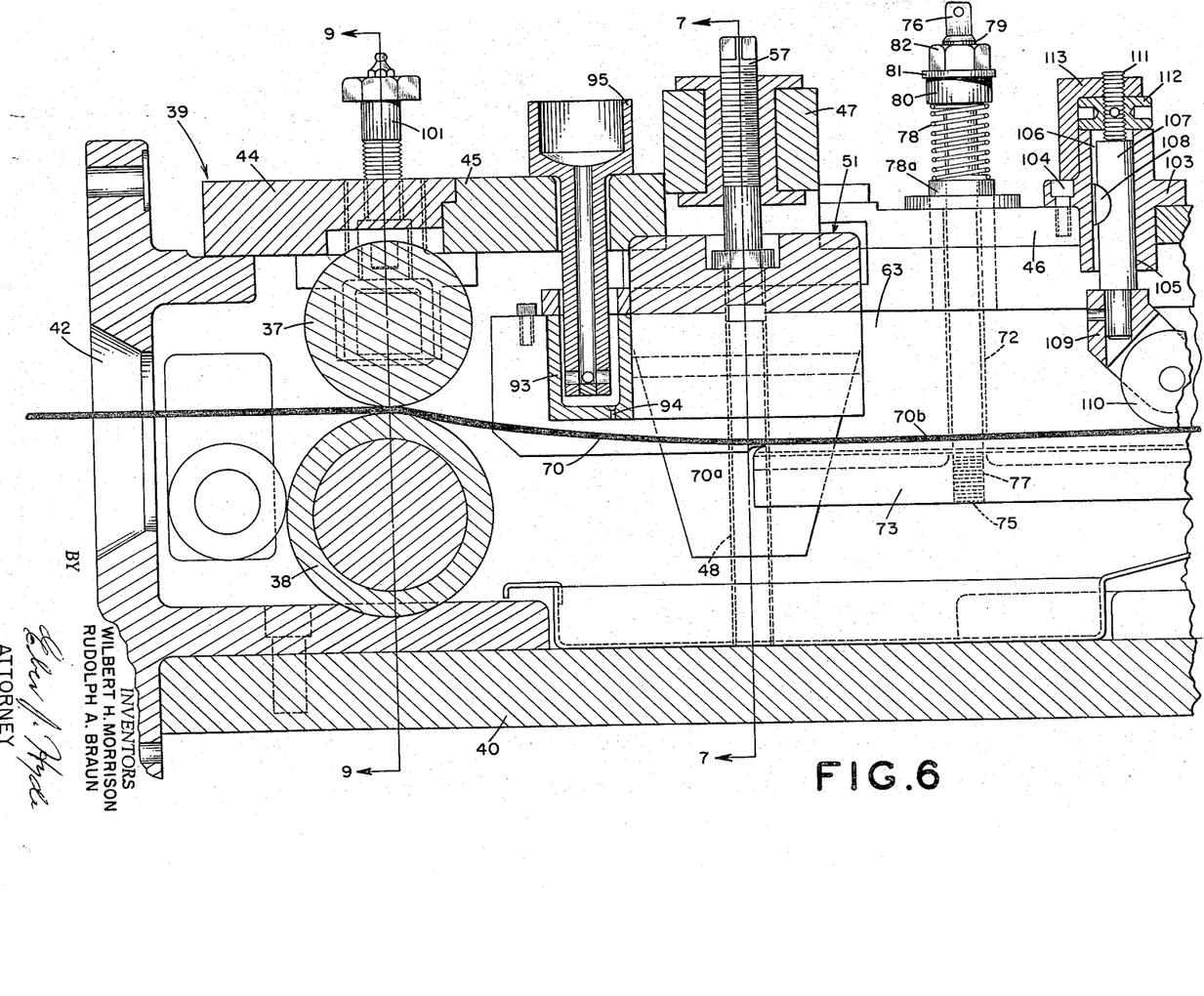
FIGURE 6 is a longitudinal sectional view of the left half of a babbitt depositing apparatus.
Figure 7:
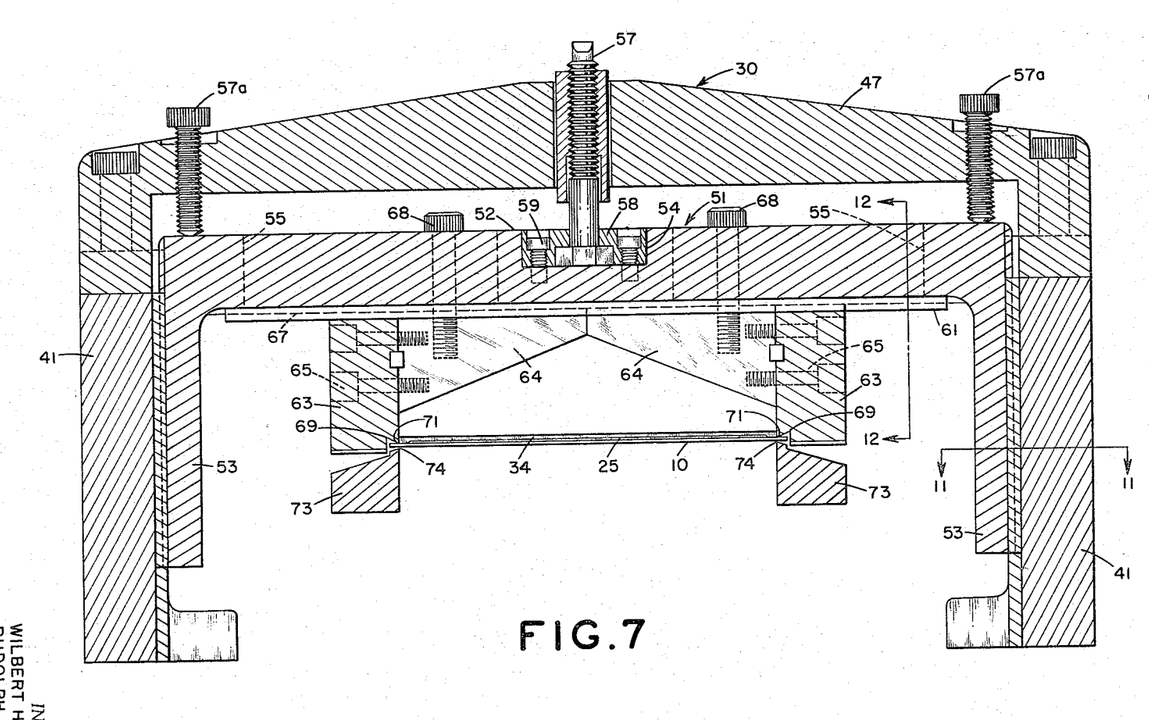
FIGURE 7 is a cross-sectional view taken on the line 7—7 of FIGURE 6.
Figures 10, 11:
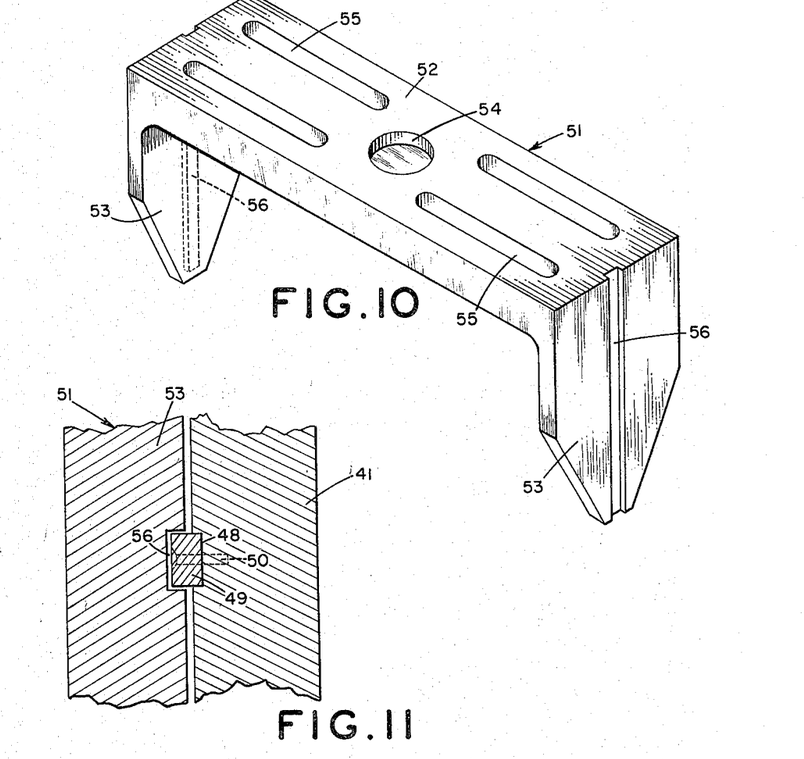
FIGURE 10 is a perspective view of one of the components of the babbitt depositing apparatus.
FIGURE 11 is a fragmentary sectional view taken on the line 11—11 of FIGURE 7.
Figure 12:
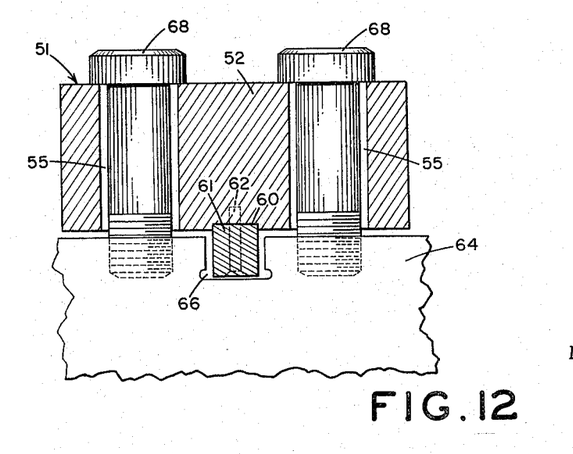
FIGURE 12 is a fragmentary sectional view taken on the line 12—12 of FIGURE 7.

The lower face of the bight 52 of the U-shaped member 51 is provided with a horizontally disposed slot 60. A horizontally disposed rib 61 is positioned in the slot 60 and is secured to the member 51 by screws 62. A pair of spaced horizontally disposed rails 63 are positioned in the housing 39 and extend longitudinally thereof. The pair of rails 63 are also positioned in the U-shaped member 51. A bracket 64 is secured to each rail 63 by bolts 65. Each rail 63 is provided with a horizontally disposed slot 66 in its upper face. Each bracket 64 is provided with a horizontally disposed slot 67 in its upper face in alignment with the respective slot 66. The rib 61 is positioned in the slots 66 in the rails 63 and is also positioned in the slots 67 in the brackets 64. A bolt 68 is positioned in each slot 55 in the member 51 so that two bolts 68 are in threaded engagement with one bracket 64 and two bolts are in threaded engagement with the other bracket 64. Thus it will be seen that the bolts 68 secure the rails 63 to the U-shaped member 51. Each rail 63 is provided with a longitudinally extending groove 69 extending its entire length and the groove inclines upwardly at 70 beginning at a location 70a adjacent one end of the rail to said one end of the rail. The groove 69 in each rail 63 also slopes upwardly at a small incline 70b beginning at the location 70a to the other end of the rail. The groove 69 provides a knife edge 71 on each rail 63. Each rail 63 is provided with a pair of spaced vertically disposed openings 72. A pair of spaced horizontally disposed rails 73 are positioned in the housing 39 below the pair of rails 63. Each rail 73 is provided with a knife edge 74 extending its entire length. Each rail 73 is also provided with a pair of spaced vertically disposed internally threaded openings 75 in registry with the vertically disposed openings 72 in the respective rail 63.

A pair of bolts 76 are positioned in the vertically disposed openings in each rail 63 and each bolt has external threads 77 in threaded engagement with the internally threaded openings 75 in the respective rail 73. A coil spring 78 is positioned on each bolt 76. Each bolt 76 also has external threads 79 and collars 80 are fitted loosely on the bolts. A washer 81 is disposed on each bolt 76 against the respective collar 80 and a nut 82 is disposed against the respective washer and is in threaded engagement with the external threads 79. A pair of bushings 78a extend through the cover plate 46 and rest upon the rails 63. These bushings 78a are only on the pair of bolts 76 adjacent to the U-shaped member 51. When the bolts 76 are turned in one direction the rails 73 move away from the rails 63. When the bolts 76 are turned in the opposite direction the rails 73 move toward the rails 63. A plate 83 is positioned in the cut-away corners of the upper rails 63. The plate 83 has a flange 84 that abuts the ends of the rails. A plate 85 is disposed midway between the side walls 41 and is bolted to the cover plate 46. A vertically disposed plate 86 is bolted to the side walls 41. A horizontally disposed plate 87 is fixedly secured to the pair of rails 63 and is disposed upon the plate 83. The plate 87 is provided with an internally threaded opening 88 in its center. A securing element 89 is positioned in a slot 90 in the plate 85. The securing element 89 has a pair of integral collars 91 having a diameter greater than the width of the slot 90 in the plate 85 so that the securing element cannot move vertically with respect to the plate. The securing element 89 also has external threads 92 in threaded engagement with the internally threaded opening 88 in the plate 87. It is to be noted that there is a clearance between the slots 56 in the member 51 and the ribs 49 on the side walls 41. When the securing element 89 is turned in one direction the exit ends of the rails 63 and 73 will move downwardly about ribs 49 and slots 56 as a horizontal pivot. When the securing element 89 is turned in the opposite direction the exit ends of the rails 63 and 73 will move upwardly about ribs 49 and slots 56 as a horizontal pivot. It is to be noted that there are 60 minutes in one degree. The exit ends of the rails 63 and 73 may be moved through an angle of about 12 minutes with the ribs 49 and slots 56 as a horizontal pivot by turning of the securing element 89.

The horizontally disposed rollers 37 and 38 are mounted in the side walls 41 of the babbitt depositing apparatus 30. When the steel and sintered copper alloy strip moves between the rollers 37 and 38 the rollers compress the steel and sintered copper alloy strip to a predetermined thickness. A trough 93 is positioned between the pair of rails 63 and is provided with a plurality of spaced holes 94 in its bottom. A funnel 95 is positioned in the trough 93 and receives liquid babbitt from the conduit 33. Liquid babbitt is distributed on the steel and sintered copper strip through the holes 94. The roller 38 and the inclines 70 in the grooves 69 in the pair of rails 63 cooperate together to hold the steel and sintered copper alloy strip in an upwardly inclined position so that liquid babbitt cannot flow on the steel and sintered copper alloy strip toward the entrance end 42 of the housing 39. The ends of the roller 37 are mounted in bushings 96 and the bushings are reciprocally mounted in the nut structures 102a. There is a clearance 97 between each bushing 96 and its respective nut structure 102a. Each nut structure 102a is provided with a vertically disposed opening 98 above the respective bushing 96. A coil spring 99 is disposed in the opening 98 in each nut structure 102a. Another bushing 100 is mounted in the opening 98 upon the coil spring 99 and projects into the coil spring. A screw 101 is in threaded engagement with an internally threaded opening 102 in the respective nut structure 102a bolted to the respective side wall 41, and is also in engagement with the bushing 100. If the steel and sintered copper alloy strip is too thick when it comes through the rollers 37 and 38 the roller 37 will move upward into the clearances 97 and the coil springs 99 will be compressed. This upward movement of the roller 37 prevents jamming of the babbitt depositing apparatus 30. It is to be noted that by turning the screw 101 downwardly the pressure of the roller 37 on the steel strip 10 and copper alloy layer 25 can be increased, thereby obtaining control over the thickness of the copper alloy layer.

Figure 6A:
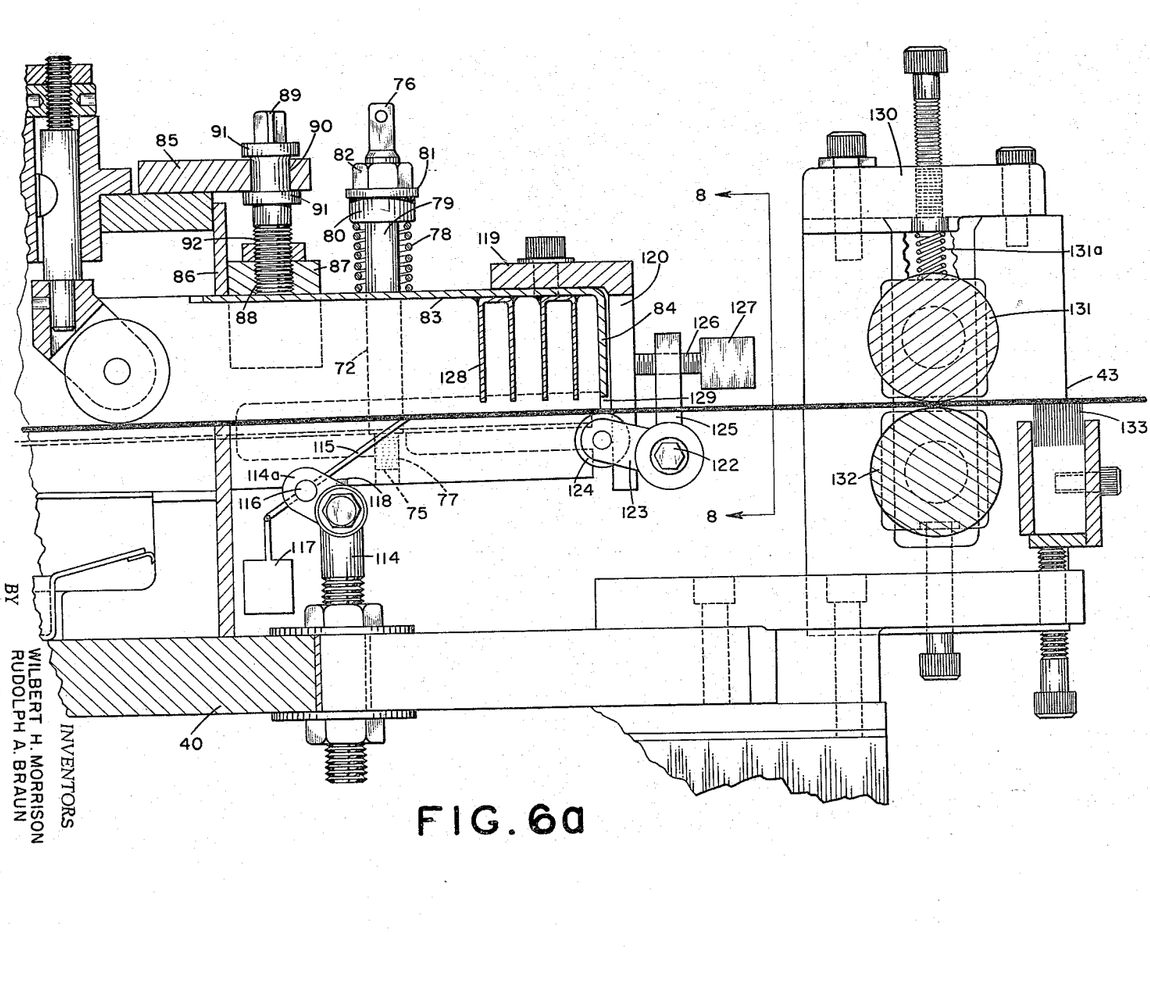
FIGURE 6a is a longitudinal sectional view of the right half of a babbitt depositing apparatus.

A bushing 103 is fixedly secured to the cover plate 46 by screws 104. The bushing 103 is provided with a vertically disposed opening 105 and is also provided with a vertically disposed slot 106 in the wall of the opening. A vertically disposed shaft 107 is disposed in the opening 105 in the bushing 103. A key 108 is fixed in the shaft 107 and is disposed in the slot 106 in the bushing 103. A bracket 109 is positioned between the pair of rails 63 and is fixedly secured to the lower end of the shaft 107. A horizontally disposed roller 110 is rotatably mounted in the bracket 109 and engages the upper face of the strip to keep the strip in a horizontal plane. The shaft 107 has external threads 111 adjacent its upper end and a nut 112 is in threaded engagement with the external threads on the shaft. A bracket 113 is fixedly secured to the bushing 103 and is provided with an opening receiving the upper end of the shaft 107. When the nut 112 is turned in one direction the key 108 slides in the slot 106 and the roller 110 moves vertically downwardly. When the nut 112 is turned in the opposite direction the key 108 slides in the slot 106 and the roller 110 moves vertically upwardly. A conduit 114 extends through and is fixedly secured to the bottom wall 40 and has an extension 114a. A deflector plate 115 is pivoted to the extension 114a at 116. A weight 117 is connected to the lower edge of the deflector plate 115 and urges the upper edge of the deflector plate against the strip. A plurality of spaced jets 118 are formed on the conduit 114. The jets 118 direct water against the deflector plate 115 and the deflector plate deflects the water against the lower face of the strip to cause the liquid babbitt to become a solid.

Figure 8:
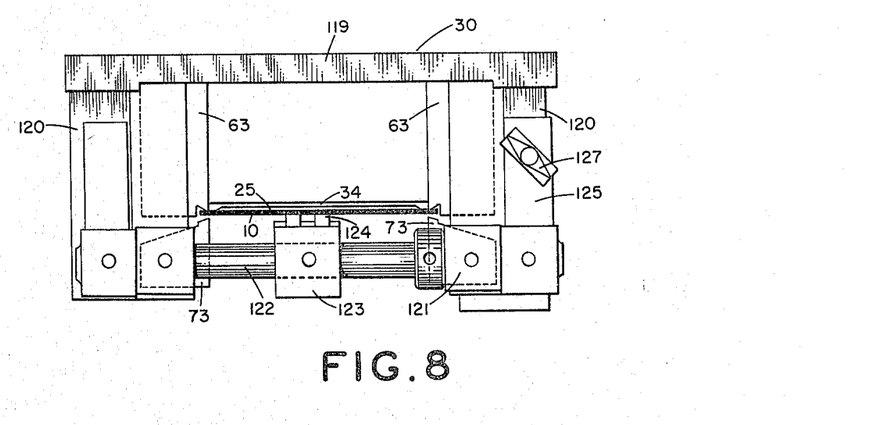
Figure 9:
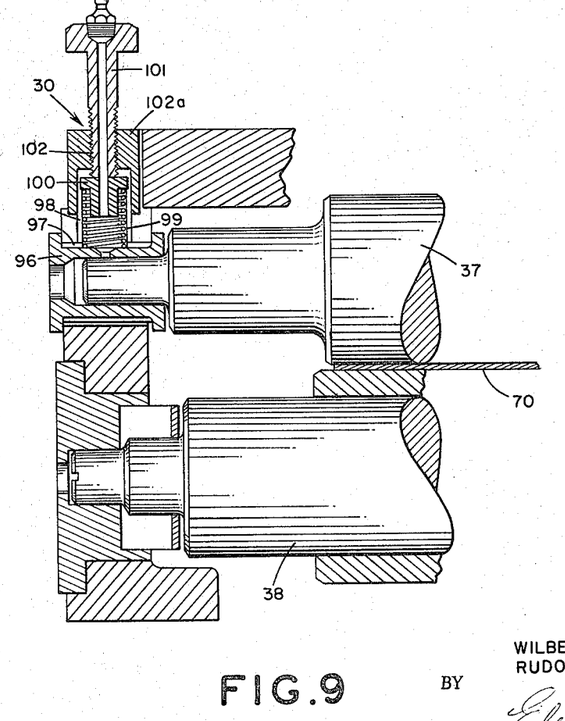
FIGURE 9 is a fragmentary cross-sectional view taken on the line 9—9 of FIGURE 6.

A horizontally disposed plate 119 is fixedly secured to the pair of rails 63 and is disposed upon the plate 83. A pair of spaced vertically disposed plates 120 are welded to the plate 119. A holder 121 is secured to each plate 120. A shaft 122 is rotatably mounted in the holders 121. A bracket 123 is fixedly secured on the shaft 122 intermediate the ends thereof. A roller 124 is rotatably mounted in the bracket 123 and engages the lower face of the strip to keep the strip in a horizontal plane. An arm 125 is fixedly secured on one end of the shaft 122. The arm 125 is provided with an internally threaded opening 126. A screw 127 is in threaded engagement with the internally threaded opening 126 in the arm 125 and also engages one of the plates 120. When the screw 127 is rotated in one direction the shaft 122 is turned in one direction causing the roller 124 to be swung upwardly. When the screw 127 is rotated in the opposite direction the shaft 122 is turned in the opposite direction causing the roller 124 to be swung downwardly. A plurality of spaced vertically disposed baffle plates 128 are positioned between the pair of rails 63 and are welded to the plate 83. There is an opening 129 between the flange 84 and the strip. The gas generator 22 moves hydrogen, carbon monoxide and nitrogen gases into the furnace 21 and these gases flow from the furnace through the entrance end 42 into the housing 39 of the babbitt depositing apparatus 30. The hydrogen, carbon monoxide and nitrogen gases provide a reducing atmosphere in the babbitt depositing apparatus 30. The babbitt will not bond to the sintered copper alloy unless there is a reducing atmosphere in the babbitt depositing apparatus 30. The flange 84 and the baffle plates 128 minimize the loss of gases from the babbitt depositing apparatus 30 through the opening 129. The flange 84 and the baffle plates 128 minimize the flow of air back through the opening 129 into the babbitt depositing apparatus 30. If too much air were to flow into the babbitt depositing apparatus 30 the air would cause oxidation and the babbitt would not bond to the sintered copper alloy.

A structure 130 is fixedly secured to the bottom wall 40. A pair of horizontally disposed rollers 131 and 132 are rotatably mounted in the structure 130. The roller 131 is also mounted for vertical reciprocal movement in the structure 130. A coil spring 131a is mounted in the structure 130 and engages the roller 131. The roller 131 engages the upper face of the strip while the roller 132 engages the lower face of the strip. The coil spring 131a allows the roller 131 to move upwardly when there is a variation in the thickness of the trimetal bearing material 36. A felt wiper 133 is fixedly secured in the structure 130 and wipes water from the lower face of the strip.

The operation of the babbitt depositing apparatus 30 is as follows: the rails 63 and the rails 73 are moved toward each other with the bolts 68 sliding in the slots 55 in the U-shaped member 51 to accommodate the proper width of steel strip 10. At this time the U-shaped member 51 and the rails 63 and the rails 73 are outside of the housing 39. Next, the U-shaped member 51 and the rails 63 and the rails 73 are installed in the housing 39. The cover plates 44, 45, 46 and the member 47 are then bolted to the side walls 41. Then the steel strip 10 is inserted through the entrance end 42 of the housing 39 and is passed between the pair of rails 63 and the pair of rails 73 and then through the exit end 43 of the housing. The U-shaped member 51 is then moved vertically on the ribs 49 by turning the securing element 57 in the proper direction until the steel strip is against the inclines 70 and 70b in the grooves 69 in the upper rails 63. The screws 57a are then turned until they are in engagement with the U-shaped member 51 to place the bight 52 of the U-shaped member 51 in a horizontal plane. The rollers 110 and 124 are then adjusted to a position against the strip by turning nut 112 and screw 127 respectively. The securing element 89 is then threaded into the internally threaded opening 88 in the plate 87. The securing element 89 may now be turned to move the rails 63 and 73 through an angle of 12 minutes to give a fine adjustment of the liquid babbitt pool.

The roller 38 and the inclines 70 in the grooves 69 of the pair of rails 63 together hold the strip inclined upwardly so that liquid babbitt will not flow toward the entrance end 42 of the babbitt depositing apparatus 30. The inclines 70b on the upper rails 63 prevent the flow of liquid babbitt toward the exit end 43 of the babbitt depositing apparatus 30. The knife edges 74 on the pair of rails 73 and the knife edges 71 on the pair of rails 63 together grip the edges of the strip so that liquid babbitt cannot flow between the knife edges 71 and the strip and off the edges of the strip.

The coil springs 78 on the securing elements 76 allow the rails 73 to move vertically downwardly from the rails 63 to allow for irregularities in the thickness of the steel strip 10.

The advantages of the babbitt depositing apparatus 30 are as follows: babbitt can be deposited on sintered copper alloy in a reducing atmosphere. The babbitt would not bond to the sintered copper alloy without the reducing atmosphere. Air would cause oxidation and the babbitt would not bond to the sintered copper alloy. The babbitt can be deposited on the sintered copper alloy at an elevated temperature in a reducing atmosphere. This is much less costly than it would be if vacuum equipment were used to deposit the babbitt on the sintered copper alloy.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Apparatus for depositing liquid babbitt on a metal strip comprising an enclosed housing having an entrance end for the metal strip and an exit end for the metal strip, means for moving said strip through said housing and for holding said strip at a given elevation at said entrance end, means within said housing for holding said strip at an elevation lower than said given elevation, means for distributing liquid babbitt on the upper face of the metal strip at the location where said strip is at said lower elevation, horizontally extending means carried by the housing and engaging the edges of the metal strip to prevent liquid babbitt from flowing off the edges of the metal strip, said horizontally extending means guiding said strip through said housing and forcing said strip to bend downwardly to said lower elevation as it moves through said housing, and means for cooling the liquid babbitt to cause it to become a solid and to bond to the metal strip as said metal strip moves toward the exit end of said housing.

2. Apparatus for depositing liquid babbitt on a metal strip comprising an enclosed housing having an entrance end for the metal strip and an exit end for the metal strip, means for moving said strip through said housing and for holding said strip at a given elevation including a first pair of spaced horizontally disposed rails positioned in the housing, a second pair of spaced horizontally disposed rails positioned below the first pair of rails, the edges of the metal strip being positioned between the first pair of rails and the second pair of rails; means within said housing for holding said strip at an elevation lower than said given elevation; means positioned between the first pair of rails for distributing liquid babbitt on the metal strip at the location where said strip is at said lower elevation; means for moving the first pair of rails and the second pair of rails vertically upwardly or vertically downwardly in the housing, means for moving the second pair of rails toward the first pair of rails to grip the edges of the metal strip to prevent liquid babbitt from flowing off the edges of the metal strip, said first and second pair of rails guiding said strip through said housing and forcing said strip to bend downwardly to said lower elevation as it moves through said housing, and means for cooling the liquid babbitt to cause it to become a solid and to bond the metal strip.

3. Apparatus for depositing liquid babbitt on a metal strip comprising an enclosed housing having an entrance end for the metal strip and an exit end for the metal strip, means for moving said strip through said housing and for holding said strip at a given elevation at said entrance end, means within said housing for holding said strip at an elevation lower than said given elevation, means carried by the housing adjacent the entrance end thereof for distributing liquid babbitt on the upper face of the metal strip at the location where said strip is at said lower elevation, to prevent liquid babbitt from flowing on the metal strip toward the entrance end of the housing, horizontally extending rail means carried by the housing and gripping the edges of the metal strip to prevent the flow of liquid babbitt off the edges of the metal strip, said rail means forcing said strip to bend downwardly from said given elevation at said entrance end to said lower elevation where said liquid babbitt is applied and forcing said strip to bend upwardly from said lower elevation toward said exit end, and means carried by the housing adjacent the exit end thereof for applying water against the lower face of the metal strip to cause the babbitt on the metal strip to become a solid.

4. Apparatus for depositing liquid babbitt on a metal strip comprising an enclosed housing having an entrance end for the metal strip and an exit end for the metal strip, means for moving said strip through said housing and for holding said strip at a given elevation at said entrance end, means within said housing for holding said strip at an elevation lower than said given elevation, means carried by the housing adjacent the entrance end thereof for distributing liquid babbitt on the upper face of the metal strip at the location where said strip is at said lower elevation for preventing liquid babbitt from flowing on the metal strip toward the entrance end of the housing, means connected to said enclosed housing for supplying thereto reducing gas, horizontally extending means carried by the housing and engaging the edges of the metal strip to prevent liquid babbitt from flowing off the edges of the metal strip, said horizontally extending means guiding said strip through said housing and forcing said strip to bend downwardly to said lower elevation as it moves through said housing, and means for cooling the liquid babbitt to cause it to become a solid and to bond to the metal strip.

5. Apparatus for depositing liquid babbitt on a metal strip comprising an enclosed housing including a pair of spaced side walls and a horizontally disposed cover positioned upon and secured to the side walls and an entrance end for the metal strip and an exit end for the metal strip, a member mounted in the side walls of the housing for vertical sliding movement, means in engagement with the member and the cover for causing vertical sliding movement of the member in the housing, means carried by the housing adjacent the entrance end thereof for distributing liquid babbitt on the upper face of the metal strip, a first pair of spaced horizontally disposed rails each being provided with a groove receiving the adjacent edge of the metal strip and extending longitudinally of the respective rail, said goove inclining downwardly beginning at a location adjacent one end of the respective rail, and then inclining upwardly to said other end thereof to prevent liquid babbitt from flowing on the metal strip toward the entrance end of the housing and each rail being secured to the member, a second pair of spaced horizontally disposed rails positioned below the first pair of rails, means for moving the second pair of rails toward and away from the first pair of rails so that the first pair of rails and the second pair of rails grip the edges of the metal strip to prevent the flow of liquid babbitt from the upper face of the metal strip, a plate positioned upon the first pair of rails adjacent to their other ends and secured to the first pair of rails, means in engagement with the plate and the cover to pivotally adjust said other ends of the first pair of rails and the second pair of rails about the mounting of the member on the side walls of the housing as a horizontal pivot axis, means carried by the housing adjacent to the exit end thereof and in engagement with the upper face of the metal strip to keep the metal strip in a horizontal plane, means carried by the housing adjacent the exit end thereof for applying water against the lower face of the metal strip to cause the babbitt on the metal strip to become a solid, and means carried by said other ends of the first pair of rails and engaging the lower face of the metal strip to keep the metal strip in a horizontal plane.

6. Apparatus for depositing liquid babbitt on a metal strip comprising an enclosed housing including a pair of spaced side walls and a horizontally disposed cover positioned upon and secured to the side walls and an entrance end for the metal strip and an exit end for the metal strip, a pair of vertically disposed ribs secured to the inner faces of the side walls of the housing, an inverted U-shaped member including a bight and a pair of legs and the pair of legs being provided with slots in their outer faces receiving the pair of ribs to mount the U-shaped member in the housing for vertical sliding movement, a first securing element in engagement with the U-shaped member and the cover for causing vertical sliding movement of the U-shaped member in the housing, means carried by the housing adjacent the entrance end thereof for distributing liquid babbitt on the upper face of the metal strip, a first pair of spaced horizontally disposed rails each being provided with a groove receiving the adjacent edge of the metal strip and extending longitudinally of the respective rail, said groove inclining downwardly beginning at a location adjacent one end of the respective rail, and then inclining upwardly to said other end thereof to prevent liquid babbitt from flowing on the metal strip toward the entrance end of the housing and each rail being secured to the bight of the U-shaped member and each rail being provided with a pair of spaced vertically disposed openings, a second pair of spaced horizontally disposed rails positioned below the first pair of rails and each of the second pair of rails being provided with a pair of spaced vertically disposed internally threaded openings in registry with the vertically disposed openings in the first pair of rails, securing elements extending through the vertically disposed openings in the first pair of rails and in threaded engagement with the vertically disposed openings in the second pair of rails to move the second pair of rails toward and away from the first pair of rails so that the first pair of rails and the second pair of rails grip the edges of the metal strip to prevent the flow of liquid babbitt from the edges of the metal strip, a plate positioned upon the first pair of rails adjacent to their other ends and secured to the first pair of rails, a securing element in engagement with the plate and the cover to pivotally adjust said other ends of the first pair of rails and the second pair of rails about the pair of vertically disposed ribs and the slots in the legs of the U-shaped member as a horizontal pivot axis, a first roller carried by the housing adjacent to the exit end thereof and in engagement with the upper face of the metal strip to keep the metal strip in a horizontal plane, means carried by the housing adjacent the exit end thereof for applying water against the lower face of the metal strip to cause the babbitt on the metal strip to become a solid, and a second roller carried by said other ends of the first pair of rails and engaging the lower face of the metal strip to keep the metal strip in a horizontal plane.

7. Apparatus for depositing liquid babbitt on a metal strip comprising an enclosed housing including a pair of spaced side walls and a horizontally disposed cover positioned upon and secured to the side walls and an entrance end for the metal strip and an exit end for the metal strip, a pair of vertically disposed ribs secured to the inner faces of the side walls of the housing, an inverted U-shaped member including a bight and a pair of legs and the bight being provided with a pair of spaced slots and the pair of legs being provided with slots in their outer faces receiving the pair of ribs to mount the U-shaped member in the housing for vertical sliding movement, a securing element in engagement with the U-shaped member and the cover for causing vertical sliding movement of the U-shaped member in the housing, a horizontally disposed rib positioned transversely of the housing and secured to the lower face of the bight of the U-shaped member, means carried by the housing adjacent the entrance end thereof for distributing liquid babbitt on the upper face of the metal strip, a first pair of spaced horizontally disposed rails each being provided with a groove receiving the adjacent edge of the metal strip and extending longitudinally of the respective rail, said groove inclining downwardly beginning at a location adjacent one end of the respective rail, and then inclining upwardly to said other end thereof to prevent liquid babbitt from flowing on the metal strip toward the entrance end of the housing and each rail being provided with a slot in its upper face receiving the horizontally disposed rib and each rail being provided with a pair of spaced vertically disposed openings, securing elements extending through the slots in the bight of the U-shaped member and in engagement with the first pair of rails, a second pair of spaced horizontally disposed rails positioned below the first pair of rails and each of the second pair of rails being provided with a pair of spaced vertically disposed internally threaded openings in registry with the vertically disposed openings in the first pair of rails, securing elements extending through the vertically disposed openings in the first pair of rails and in threaded engagement with the vertically disposed openings in the second pair of rails to move the second pair of rails toward and away from the first pair of rails so that the first pair of rails and the second pair of rails grip the edges of the metal strip to prevent the flow of liquid babbitt from the edges of the metal strip, a plate positioned upon the first pair of rails adjacent to their other ends and secured to the first pair of rails, a securing element in engagement with the plate and the cover to pivotally adjust said other ends of the first pair of rails about the pair of vertically disposed ribs and the slots in the legs of the U-shaped member as a horizontal pivot axis, a first roller carried by the housing adjacent to the exit end thereof and in engagement with the upper face of the metal strip to keep the metal strip in a horizontal plane, means carried by the housing adjacent the exit end thereof for applying water against the lower face of the metal strip to cause the babbitt on the metal strip to become a solid, and a second roller carried by said other ends of the first pair of rails and engaging the lower face of the metal strip to keep the metal strip in a horizontal plane.

8. Apparatus for depositing liquid babbitt on a metal strip comprising an enclosed housing including a pair of spaced side walls and a horizontally disposed cover positioned upon and secured to the side walls and an entrance end for the metal strip and an exit end for the metal strip, a pair of vertically disposed ribs secured to the inner faces of the side walls of the housing, an inverted U-shaped member including a bight and a pair of legs and the bight being provided with a pair of spaced slots and the pair of legs being provided with slots in their outer faces receiving the pair of ribs to mount the U-shaped member in the housing for vertical sliding movement, a securing element in engagement with the U-shaped member and the cover for causing vertical sliding movement of the U-shaped member in the housing, a horizontally disposed rib positioned transversely of the housing and secured to the lower face of the bight of the U-shaped member, means carried by the housing for distributing liquid babbitt on the upper face of the metal strip, a first pair of spaced horizontally disposed rails positioned in the housing and the rails each being provided with a groove extending longitudinally of the respective rail, said groove including downwardly beginning at a location adjacent one end of the respective rail, and then inclining upwardly to said other end thereof to prevent liquid babbitt from flowing on the metal strip toward the entrance end of the housing and each rail being provided with a slot in its upper face receiving the horizontally disposed rib and each rail being provided with a pair of spaced vertically disposed openings, securing elements extending through the slots in the bight of the U-shaped member and in engagement with the first pair of rails, a second pair of spaced horizontally disposed rails positioned below the first pair of rails and each rail being provided with a pair of spaced vertically disposed internally threaded openings in registry with the vertically disposed openings in the first pair of rails, securing elements extending through the vertically disposed openings in the first pair of rails and in threaded engagement with the vertically disposed openings in the second pair of rails to move the second pair of rails toward or away from the first pair of rails so that the first pair of rails and the second pair of rails grip the edges of the metal strip to prevent the flow of liquid babbitt from the edges of the metal strip, a plate positioned upon the first pair of rails adjacent to their other ends and secured to the first pair of rails, a securing element in engagement with the plate and the cover to pivotally adjust said other ends of the first pair of rails about the pair of vertically disposed ribs and the slots in the legs of the U-shaped member as a horizontal pivot axis, a first roller carried by the housing adjacent to the exit end thereof and in engagement with the upper face of the metal strip to keep the metal strip in a horizontal plane, means carried by the housing adjacent the exit end thereof for applying water against the lower face of the metal strip to cause the babbitt on the metal strip to become a solid, a second roller carried by said other ends of the first pair of rails and engaging the lower face of the metal strip to keep the metal strip in a horizontal plane, and a plurality of vertically disposed baffle plates extending between the first pair of rails and carried by the first named plate to minimize the entrance of air.

References Cited by the Examiner

UNITED STATES PATENTS

| | | | |
|---|---|---|---|
| 359,349 | 3/1887 | Daniels | 22—57.3 |
| 2,198,253 | 6/1936 | Koehring | 29—149.5 |
| 2,978,761 | 4/1961 | Foye et al. | 22—57.4 |
| 3,080,627 | 3/1963 | Hoteko | 22—57.4 |
| 3,087,814 | 4/1963 | Smiley | 75—208 |
| 3,094,415 | 6/1963 | Gallatin et al. | 75—208 |

FOREIGN PATENTS 493,815  4/1954  Italy.

J. SPENCER OVERHOLSER, *Primary Examiner.*

REUBIN EPSTEIN, *Examiner.*

R. L. GOLDBERG, R. S. ANNEAR,
*Assistant Examiners.*

UNITED STATES PATENT OFFICE
CERTIFICATE OF CORRECTION

Patent No. 3,290,735　　　　　　　　　　　　　December 13, 1966

Wilbert H. Morrison et al.

It is hereby certified that error appears in the above numbered patent requiring correction and that the said Letters Patent should read as corrected below.

Column 12, line 38, for "including" read -- inclining --.

Signed and sealed this 19th day of Spetember 1967.

(SEAL)
Attest:

ERNEST W. SWIDER　　　　　　　　　　　　　EDWARD J. BRENNER
Attesting Officer　　　　　　　　　　　　　　Commissioner of Patents